US009838747B2

(12) United States Patent
Olague et al.

(10) Patent No.: US 9,838,747 B2
(45) Date of Patent: *Dec. 5, 2017

(54) CROSS-PLATFORM MESSAGING

(71) Applicant: Rovi Guides, Inc., San Carlos, CA (US)

(72) Inventors: Craig Alan Olague, Moorpark, CA (US); Kuan Hidalgo Archer, Glendale, CA (US); Henry C. Chilvers, Jr., Valencia, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,207

(22) Filed: Aug. 23, 2016

(65) Prior Publication Data
US 2016/0360274 A1   Dec. 8, 2016

Related U.S. Application Data

(63) Continuation of application No. 14/015,517, filed on Aug. 30, 2013, now Pat. No. 9,456,252, which is a (Continued)

(51) Int. Cl.
*H04W 4/00* (2009.01)
*H04N 21/4788* (2011.01)
(Continued)

(52) U.S. Cl.
CPC ....... *H04N 21/4788* (2013.01); *H04N 21/235* (2013.01); *H04N 21/4126* (2013.01);
(Continued)

(58) Field of Classification Search
CPC .................. H04N 21/4126; H04N 21/4312
(Continued)

(56) References Cited

U.S. PATENT DOCUMENTS 4,429,385 A    1/1984  Cichelli et al.
4,625,080 A   11/1986  Scott
(Continued)

FOREIGN PATENT DOCUMENTS

DE    3151492    7/1983
DE   19531121    2/1997
(Continued)

OTHER PUBLICATIONS

3G Partnership Project Technical Standard TS 23.040 V2.0.0 of Jun. 1999.
(Continued)

*Primary Examiner* — Kiet Doan
(74) *Attorney, Agent, or Firm* — Haley Guiliano LLP

(57) ABSTRACT

Systems and methods are provided for displaying a short message service (SMS) message on user media equipment, in which the user media equipment includes a set-top box and a display. In some embodiments, the set-top box receives an SMS message, wherein the SMS message includes information identifying a triggering event for displaying the SMS message. The SMS message is stored until the occurrence and detection of the identified triggering event. In response to detecting the occurrence of the identified triggering event, the SMS message is displayed on at least a portion of the display of the user media equipment.

20 Claims, 5 Drawing Sheets

Related U.S. Application Data continuation of application No. 13/336,994, filed on Dec. 23, 2011, now Pat. No. 8,565,797, which is a continuation of application No. 11/899,763, filed on Sep. 7, 2007, now Pat. No. 8,107,977.

(51) Int. Cl.

| | | |
|---|---|---|
| *H04N 21/235* | (2011.01) | |
| *H04N 21/433* | (2011.01) | |
| *H04N 21/435* | (2011.01) | |
| *H04N 21/488* | (2011.01) | |
| *H04N 21/858* | (2011.01) | |
| *H04N 21/41* | (2011.01) | |
| *H04N 21/431* | (2011.01) | |
| *H04W 4/14* | (2009.01) | |

(52) U.S. Cl.
CPC ....... *H04N 21/435* (2013.01); *H04N 21/4312* (2013.01); *H04N 21/4331* (2013.01); *H04N 21/488* (2013.01); *H04N 21/4882* (2013.01); *H04N 21/858* (2013.01); *H04W 4/14* (2013.01)

(58) Field of Classification Search
USPC ........ 455/415, 466, 567, 406, 564; 715/739, 715/752; 725/31, 109, 32, 46, 9
See application file for complete search history.

(56) References Cited

U.S. PATENT DOCUMENTS

| | | |
|---|---|---|
| 4,694,490 A | 9/1987 | Harvey et al. |
| 4,706,121 A | 11/1987 | Young |
| 4,751,578 A | 6/1988 | Reiter |
| 4,761,684 A | 8/1988 | Clark et al. |
| 4,787,063 A | 11/1988 | Muguet |
| 4,908,707 A | 3/1990 | Kinghorn |
| 5,036,314 A | 7/1991 | Barillari et al. |
| 5,089,885 A | 2/1992 | Clark |
| 5,113,259 A | 5/1992 | Romesburg et al. |
| 5,132,992 A | 7/1992 | Yurt et al. |
| 5,155,591 A | 10/1992 | Wachob |
| 5,157,768 A | 10/1992 | Hoeber et al. |
| 5,223,924 A | 6/1993 | Strubbe et al. |
| 5,233,423 A | 8/1993 | Jernigan et al. |
| 5,253,066 A | 10/1993 | Vogel |
| 5,335,277 A | 8/1994 | Harvey et al. |
| 5,353,121 A | 10/1994 | Young et al. |
| 5,359,367 A | 10/1994 | Stockill |
| 5,382,983 A | 1/1995 | Kwoh et al. |
| 5,410,326 A | 4/1995 | Goldstein |
| 5,414,756 A | 5/1995 | Levine |
| 5,436,676 A | 7/1995 | Pint et al. |
| 5,455,570 A | 10/1995 | Cook et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,502,504 A | 3/1996 | Marshall et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,754 A | 7/1996 | Young et al. |
| 5,534,911 A | 7/1996 | Levitan |
| 5,550,576 A | 8/1996 | Klosterman |
| 5,559,548 A | 9/1996 | Davis et al. |
| 5,559,549 A | 9/1996 | Hendricks et al. |
| 5,559,550 A | 9/1996 | Mankovitz |
| 5,570,295 A | 10/1996 | Isenburg et al. |
| 5,572,442 A | 11/1996 | Schulhof et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,604,544 A | 2/1997 | Bertram |
| 5,606,374 A | 2/1997 | Bertram |
| 5,617,526 A | 4/1997 | Oran et al. |
| 5,619,249 A | 4/1997 | Billock et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,640,484 A | 6/1997 | Mankovitz |
| 5,654,748 A | 8/1997 | Matthews et al. |
| 5,657,072 A | 8/1997 | Aristides et al. |
| 5,666,293 A | 9/1997 | Metz et al. |
| 5,675,390 A | 10/1997 | Schindler et al. |
| 5,682,206 A | 10/1997 | Wehmeyer et al. |
| 5,692,214 A | 11/1997 | Levine |
| 5,694,163 A | 12/1997 | Harrison |
| 5,699,107 A | 12/1997 | Lawler et al. |
| 5,710,601 A | 1/1998 | Marshall et al. |
| 5,734,853 A | 3/1998 | Hendricks et al. |
| 5,734,893 A | 3/1998 | Li et al. |
| 5,748,191 A | 5/1998 | Rozak et al. |
| 5,748,716 A | 5/1998 | Levine |
| 5,758,257 A | 5/1998 | Herz et al. |
| 5,758,259 A | 5/1998 | Lawler |
| 5,781,246 A | 7/1998 | Alten et al. |
| 5,787,259 A | 7/1998 | Haroun et al. |
| 5,788,507 A | 8/1998 | Redford et al. |
| 5,790,202 A | 8/1998 | Kummer et al. |
| 5,793,964 A | 8/1998 | Rogers et al. |
| 5,798,785 A | 8/1998 | Hendricks et al. |
| 5,812,931 A | 9/1998 | Yuen |
| 5,828,420 A | 10/1998 | Marshall et al. |
| 5,844,620 A | 12/1998 | Coleman et al. |
| 5,850,218 A | 12/1998 | LaJoie et al. |
| 5,858,866 A | 1/1999 | Berry et al. |
| 5,867,233 A | 2/1999 | Tanaka |
| 5,880,768 A | 3/1999 | Lemmons et al. |
| 5,886,732 A | 3/1999 | Humpleman |
| 5,907,323 A | 5/1999 | Lawler et al. |
| 5,914,746 A | 6/1999 | Matthews, III et al. |
| 5,977,964 A | 11/1999 | Williams et al. |
| 5,988,078 A | 11/1999 | Levine |
| 6,002,394 A | 12/1999 | Schein et al. |
| 6,014,184 A | 1/2000 | Knee et al. |
| 6,075,575 A | 6/2000 | Schein et al. |
| 6,078,348 A | 6/2000 | Klosterman et al. |
| 6,097,441 A | 8/2000 | Allport |
| 6,104,334 A | 8/2000 | Allport |
| 6,118,492 A | 9/2000 | Milnes et al. |
| 6,130,726 A | 10/2000 | Darbee et al. |
| 6,151,059 A | 11/2000 | Schein et al. |
| 6,172,677 B1 | 1/2001 | Stautner |
| 6,208,384 B1 | 3/2001 | Schultheiss |
| 6,233,734 B1 | 5/2001 | Macrae et al. |
| 6,263,501 B1 | 7/2001 | Schein et al. |
| 6,268,849 B1 | 7/2001 | Boyer et al. |
| 6,310,886 B1 | 10/2001 | Barton |
| 6,331,877 B1 | 12/2001 | Bennington et al. |
| 6,357,043 B1 | 3/2002 | Ellis et al. |
| 6,388,714 B1 | 5/2002 | Schein et al. |
| 6,463,585 B1 | 10/2002 | Hendricks et al. |
| 6,499,138 B1 | 12/2002 | Swix et al. |
| 6,611,654 B1 | 8/2003 | Shteyn |
| 6,760,537 B2 | 7/2004 | Mankovitz |
| 6,813,775 B1 | 11/2004 | Finseth et al. |
| 6,837,789 B2 | 1/2005 | Garahi et al. |
| 6,950,624 B2 | 9/2005 | Kim et al. |

(56) References Cited

U.S. PATENT DOCUMENTS

| | | | |
|---|---|---|---|
| 7,020,704 | B1 | 3/2006 | Lipscomb et al. |
| 7,062,777 | B2 | 6/2006 | Alba et al. |
| 7,088,952 | B1 | 8/2006 | Saito et al. |
| 2002/0010926 | A1 | 1/2002 | Lee |
| 2002/0056087 | A1 | 5/2002 | Berezowski et al. |
| 2002/0057285 | A1* | 5/2002 | Nicholas, III ...... G06F 3/04812 715/700 |
| 2002/0090203 | A1 | 7/2002 | Mankovitz |
| 2003/0084453 | A1 | 5/2003 | Laughlin et al. |
| 2003/0163813 | A1 | 8/2003 | Klosterman et al. |
| 2003/0164858 | A1 | 9/2003 | Klosterman et al. |
| 2003/0188310 | A1 | 10/2003 | Klosterman et al. |
| 2003/0188311 | A1 | 10/2003 | Yuen et al. |
| 2003/0196201 | A1 | 10/2003 | Schein et al. |
| 2003/0208756 | A1 | 11/2003 | Macrae et al. |
| 2003/0226143 | A1 | 12/2003 | Michael et al. |
| 2004/0010806 | A1* | 1/2004 | Yuen ...................... G09F 27/00 725/136 |
| 2004/0034873 | A1 | 2/2004 | Zenoni |
| 2005/0120373 | A1 | 6/2005 | Thomas et al. |
| 2005/0204388 | A1 | 9/2005 | Knudson et al. |
| 2005/0251827 | A1 | 11/2005 | Ellis et al. |
| 2006/0019702 | A1 | 1/2006 | Anttila et al. |
| 2006/0031883 | A1 | 2/2006 | Ellis et al. |
| 2006/0259923 | A1 | 11/2006 | Chin |
| 2007/0049303 | A1 | 3/2007 | Lee et al. |
| 2007/0157249 | A1 | 7/2007 | Cordray et al. |
| 2007/0162502 | A1 | 7/2007 | Thomas et al. |
| 2007/0168539 | A1 | 7/2007 | Day et al. |
| 2007/0174336 | A1 | 7/2007 | Day et al. |
| 2007/0245019 | A1 | 10/2007 | Westberg et al. |
| 2008/0155059 | A1 | 6/2008 | Hardin et al. |
| 2008/0268882 | A1 | 10/2008 | Moloney |

FOREIGN PATENT DOCUMENTS

| | | |
|---|---|---|
| DE | 19740079 | 3/1999 |
| EP | 0774853 | 5/1997 |
| EP | 0793225 | 9/1997 |
| EP | 0805594 | 11/1997 |
| EP | 1643711 | 4/2006 |
| EP | 1758409 | 2/2007 |
| GB | 2265792 | 10/1993 |
| JP | 03022770 | 1/1991 |
| JP | 08056352 | 2/1996 |
| JP | 09102827 | 4/1997 |
| JP | 11243570 | 9/1999 |
| JP | 2004-328525 | 11/2004 |
| JP | 2005-236777 | 9/2005 |
| JP | 2007-60674 | 3/2007 |
| JP | 2007-504718 | 3/2007 |
| JP | 2007-004781 | 11/2007 |
| WO | WO 87/03766 | 6/1987 |
| WO | WO 89/03085 | 4/1989 |
| WO | WO 94/14282 | 6/1994 |
| WO | WO 95/01056 | 1/1995 |
| WO | WO 95/01057 | 1/1995 |
| WO | WO 95/01059 | 1/1995 |
| WO | WO 95/10910 | 4/1995 |
| WO | WO 95/28055 | 10/1995 |
| WO | WO 95/32585 | 11/1995 |
| WO | WO 96/07270 | 3/1996 |
| WO | WO 96/13932 | 5/1996 |
| WO | WO 96/41470 | 6/1996 |
| WO | WO 96/20555 | 7/1996 |
| WO | WO 97/13368 | 4/1997 |
| WO | WO 97/31480 | 8/1997 |
| WO | WO 97/36422 | 10/1997 |
| WO | WO 97/47106 | 12/1997 |
| WO | WO 97/47143 | 12/1997 |
| WO | WO 97/49237 | 12/1997 |
| WO | WO 97/50251 | 12/1997 |
| WO | WO 98/10589 | 3/1998 |
| WO | WO 98/16062 | 4/1998 |
| WO | WO 98/17064 | 4/1998 |
| WO | WO 98/26584 | 6/1998 |
| WO | WO 99/14947 | 3/1999 |
| WO | WO 99/30491 | 6/1999 |
| WO | WO 00/52928 | 9/2000 |
| WO | WO 01/39493 | 5/2001 |
| WO | WO 02/058393 | 7/2002 |
| WO | WO 02/093400 | 11/2002 |
| WO | WO 03/075128 | 9/2003 |
| WO | WO 2004/025940 | 3/2004 |
| WO | WO 2004/066648 | 8/2004 |
| WO | WO 2005/022344 | 3/2005 |
| WO | WO 2006/018685 | 2/2006 |

OTHER PUBLICATIONS

Eitz, "Zukunftige Informations-Und Datenangebote Beim Digitalen Fernsehen—EPG Und "Lesezeichen"," Rundfunktechnische Mitteilungen, vol. 41, pp. 76-72, Apr. 30, 1997.

Honey, is there anything good on the remote tonight?, advertisement from Multichannel News, Broadband Week Section, p. 168, Nov. 30, 1998.

How Evolve Works, from the Internet at http://www.evolveproducts.com/network.html, printed on Dec. 28, 1998.

Jaidev, "XSLT—A Wired and Wireless Case Study," http:/csharpcomputing.com/XMLTutorial/Lession15.htm, copyright 2004, printed on Oct. 14, 2005.

Jini Architecture Overview, by Jim Waldo, from the Internet at http://Java.sun.com/products/jini/whitepapers/architectureoverview.pdf/ printed on Jan. 25, 1999. The document bears a copyright date of 1998.

Neumann, "WDR Online Aufbau Und Perspektiven Automatisierter Online-Dienste Im WDR," Rundfunktechnische Mitteilungen, vol. 41, pp. 56-66, Jun. 1997.

Nokia CIMD Interface Specification (DN99266924 Issue 5a-0), copyright dated 2002.

Papers Delivered (Part 1), 61st National Conference, Information Processing Society of Japan, Oct. 3-5, 2000.

Pogue, "State of the Art: For TiVo and Replay, New Reach," N.Y. Times, May 29, 2003.

Randerson, "Let Software Catch the Game for You," New Scientist, Jul. 3, 2004.

Reaching your subscribers is a complex and costly process—until now, from the Internet at http://www.evolveproducts.com/info.html, printed on Dec. 28, 1998.

Rogers, "Telcos vs. Cable TV: The Global View," Data Communications, No. 13, New York, pp. 75, 76, 78 and 80, Sep. 1995.

SMS Forum Short Message Peer-to-Peer Protocol Specification Version 5.0 of Feb. 19, 2003.

Steinhorn et al., "Enhancing TV with ATVEF", Embedded Systems Programming, Oct. 1999, pp. 55-64.

Sun's Next Steps in Digital Set-Tops, article in Cablevision, p. 56, Nov. 16, 1998.

The Evolve EZ Guide. The Remote Control, from the Internet at http://www.evolveproducts.com/display2.html, printed on Dec. 28, 1998.

Using Starsight 2, published before Apr. 19, 1995.

What is Jini?, from the Internet at http://java.sun.com/products/jini/whitepapers/whatsjini.pdf, printed on Jan. 25, 1999.

Why Jini Now?, from the internet at http://java.sun.com/products/jini/whitepapers/whyjininow.pdf, printed on Jan. 25, 1999. The document bears a copyright date of 1998.

\* cited by examiner

CROSS-PLATFORM MESSAGING

CROSS-REFERENCE TO RELATED APPLICATIONS

This application is a continuation of U.S. patent application Ser. No. 14/015,517, filed Aug. 30, 2013, which is a continuation of U.S. patent application Ser. No. 13/336,994, filed Dec. 23, 2011, now U.S. Pat. No. 8,565,797, which is a continuation of U.S. patent application Ser. No. 11/899,763, filed Sep. 7, 2007, now U.S. Pat. No. 8,107,977, all of which are hereby incorporated by reference herein in their entireties.

BACKGROUND OF THE INVENTION

The present invention relates to receiving and displaying a short message service (SMS) message on a user equipment device, such as a set-top box of a user media equipment.

Short message service (SMS), also known as text messaging, refers to a protocol for sending and receiving short messages (SMS can also refer to the messages themselves) between mobile devices. Many mobile phones and personal data assistants (PDA) include SMS as a standard feature and, as a result, messaging via SMS is widely used by the users of such devices. An advantage of SMS is that SMS messages can be quickly composed and sent to a desired recipient. Notification and display of the message on the recipient's mobile device usually occurs immediately upon receipt of the SMS.

Despite these and other useful features, the SMS protocol has not been fully implemented on certain other devices, particularly less- or non-mobile devices that are not normally considered to be platforms for sending, receiving or displaying SMS messages. Furthermore, such devices, unlike mobile phones, may not be configured to serve as dedicated communication devices, and thus systems and methods for controlling the notification and display of SMS messages on such devices do not exist.

SUMMARY OF THE INVENTION

In the present invention, methods and systems are provided for displaying short message service (SMS) messages on a user equipment device. In some embodiments, the user equipment devices can be a user media equipment which includes a set-top box and a display. At least some portion of the set-top box can be integrated with the display. The set-top box can receive an SMS message, wherein the SMS message includes information that can identify a triggering event for displaying the SMS message. The SMS message can be stored until the occurrence of the identified triggering event. In response to detecting the occurrence of the identified triggering event, the SMS message can be displayed on at least a portion of the display of the user media equipment. The received SMS message can be displayed in a pop-up window, or in an overlay, either of which may be displayed over an underlying display.

Such embodiments may provide certain advantages. For example, while SMS messages are usually displayed upon their receipt, displaying the SMS message upon detection of the occurrence of a triggering event may advantageously provide the option of controlling the time and/or circumstances of displaying the SMS message, so that the message is displayed at a more opportune, appropriate, or suitable time. Another advantage may be that by displaying the SMS message in response to certain triggering events, the displayed message can provide information or notification relating to the triggering event. Another advantage may be that displaying the SMS message can be made conditional to the occurrence of the triggering events. Other suitable advantages will be apparent to those skilled in the art.

The triggering event for displaying the SMS message can include, without limitation, a specified time of day, a specified date, a broadcast time of a specified program received by the set-top box, a display of a specified commercial on the user media equipment, a specified time interval prior to a broadcast time of a specified program received by the set-top box, an marked event in a calendar, a display of a user-specified reminder on the user media equipment, an occurrence of an external event (e.g., a news event, a weather event, a financial-related event, a traffic event, etc.), or any combination thereof.

The triggering event for displaying the SMS message can also include an action taken by a user. Such user actions can include, without limitation, tuning the set-top box to a specified channel, selecting a specified program to be displayed on the user media equipment, setting a reminder, acknowledging a displayed notification message that is displayed on the user media equipment, starting the user media equipment, starting an application, providing user-identifying information, or any combination thereof.

In some embodiments of the present invention, the set-top box can be configured to receive a broadcast signal from a broadcast service, and the SMS message can be received via the broadcast signal. Examples of the broadcast service can include, without limitation, digital satellite broadcast service, digital cable broadcast service, or digital terrestrial broadcast service.

The broadcast signal can include a vertical blanking interval (VBI), within which the SMS message is encoded and received.

In some embodiments of the present, invention, an interactive media guidance application can be implemented and displayed on the user media equipment, and the received SMS message can be displayed in at least a portion of the interactive media guidance application display.

In some embodiments of the present invention, the SMS message can be an extended SMS message. The extended SMS message can include content such as, without limitation, a text message, at least one video clip, at least one audio clip, at least one picture, at least one universal resource locator, or any combination thereof.

The present invention can include other types of messages, such as a long SMS message, a concatenated SMS message, an enhanced SMS message (EMS), a multimedia SMS message (MMS), or any combination thereof.

In some embodiments of the present invention, the SMS message can include information identifying one or more intended recipients of the SMS message, and that at least one of the intended recipients of the SMS message is the set-top box is determined when the SMS message is received.

In some embodiments of the present invention, a plurality of SMS messages can be received, and the received plurality of SMS messages are concatenated to create the SMS message. In some embodiments of the present invention, at least one of the received plurality of SMS messages includes the information that identifies the triggering event.

In some embodiments of the present invention, a user response to the displayed SMS message is received by the set-top box, and the user response is sent from the set-top box to a sender of the displayed SMS message. In some embodiments of the present invention, the user response is sent via an email-to-SMS gateway.

In some embodiments of the present invention, the set-top box is configured to be in signal communication with a plurality of other recipient devices, each of which are configured to display SMS messages. The received SMS message is addressed to at least one of the plurality of other recipient devices. When receiving the SMS message, the at least one of the plurality of other recipient devices to which the received SMS message is addressed is determined, and the received SMS message is forwarded to the at least one of the plurality of other recipient devices to which the received SMS message is addressed.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices; or for media content available both through a television and one or more of these devices. The media guidance applications may be provided as online applications (i.e., provided on a website), or as stand-alone applications or clients on hand-held computers, PDAs, mobile telephones, or other mobile devices. The various devices and platforms that may implement media guidance applications are described in more detail below.

Figure 1:
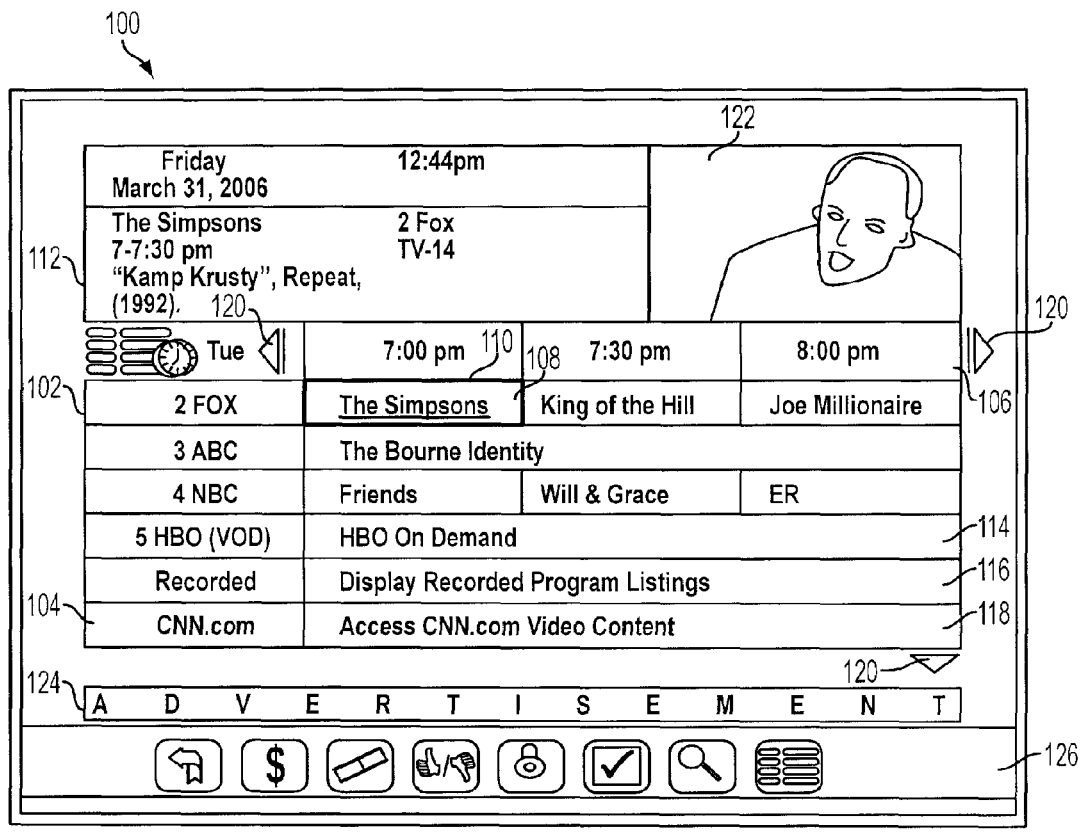
FIGS. 1 and 2 show illustrative display screens that may be used to provide media guidance application listings in accordance with one embodiment of the invention.
Figure 2:
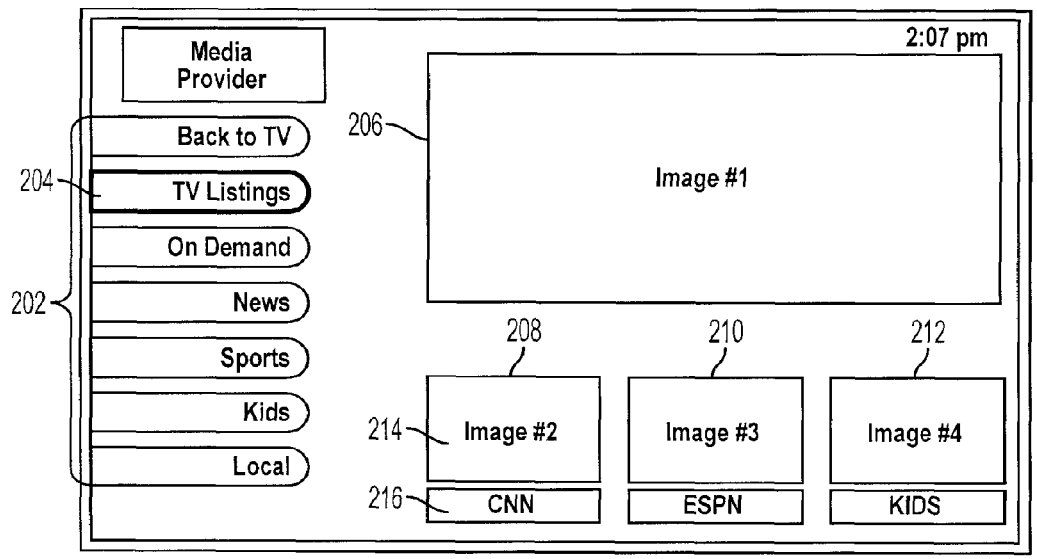

One of the functions of the media guidance application is to provide media listings and media information to users. FIGS. 1-2 show illustrative display screens that may be used to provide media guidance, and in particular media listings. The display screens shown in FIGS. 1 and 2 may be implemented on any suitable device or platform. While the displays of FIGS. 1 and 2 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g., FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
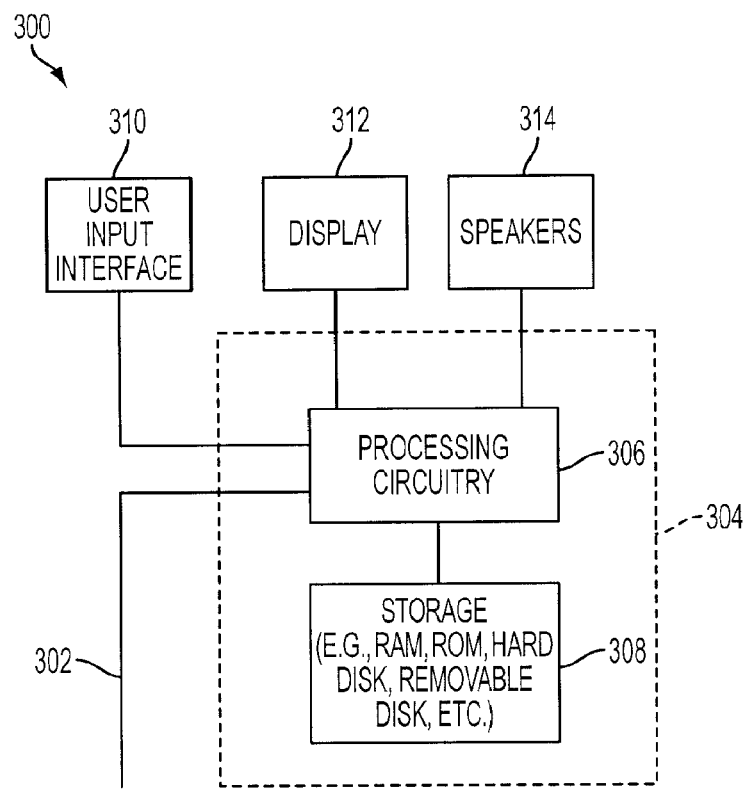
FIG. 3 shows an illustrative user equipment device in accordance with one embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, a wireless modem, or a public land mobile network (PLMN) interface for communications with other equipment or service provider. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Non-volatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
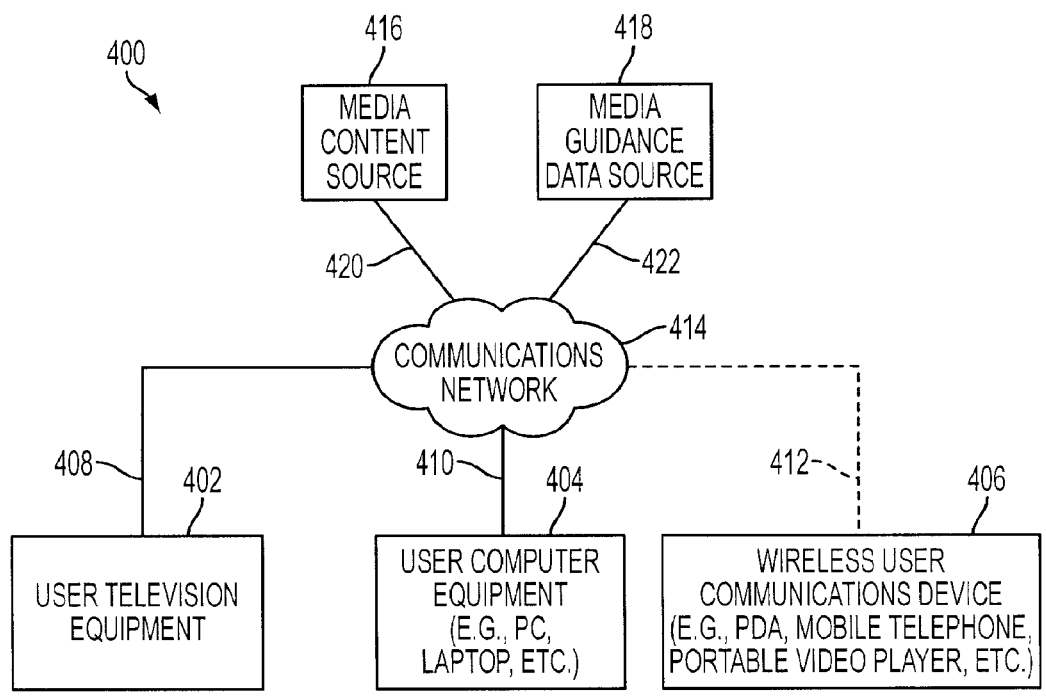
FIG. 4 is a diagram of an illustrative cross-platform interactive media system in accordance with one embodiment of the invention.

User equipment device 300 of FIG. 3 can be implemented in system 400 of FIG. 4 as user television equipment (or user media equipment) 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network (e.g., a public land mobile network (PLMN)), mobile device (e.g., Blackberry) network, cable network, public switched telephone network, or other types of communications network or combinations of communications networks. Communications network 414 may also include relays, interfaces, gateways, service centers, or any other suitable infrastructure. For example, BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

The present invention provides an implementation of short message service (SMS) on user equipment devices. User equipment devices, as illustratively shown in FIGS. 3 and 4, include, for example, user television or media devices 402, user computer devices 404, and wireless user communication device 406, or any other suitable device. Any other suitable device may also be used in the present invention. For example, suitable equipment may include the capability to receive an SMS message, to send an SMS message, to display an SMS message, or any suitable combination thereof. The hardware and software for such configurations are known in the art.

SMS messages may be classified as mobile-originated short messages (MO-SM) or mobile-terminated short messages (MT-SM), in which the message can be sent by or received by, respectively, a mobile or other suitable device. SMS messages can also be classified as point-to-point (SMS-PP), which both the sender and the receiver of the message are specified. An SMS message may can also be broadcast, in which an SMS message is sent, en masse, to plurality of mobile devices. This plurality of mobile devices may be determined based on geography (e.g., the mobile devices within a specified area), affiliation (e.g., the mobile devices using a particular mobile service), subscription (e.g., the mobile users who have expressed interest in and/or subscribed to a particular service), or any other suitable grouping.

In addition, sent SMS messages can be received and relayed by a short message service center (SMSC), which may be part of a mobile service center. Referring again to FIG. 4, communications network 414 may include one or more of such SMSCs. Messages received by the SMSC can be handled on a "store-and-forward" system, as is known in the art. SMSCs can also include gateways and interfaces to other networks and services, such as to one or more public-switched telephone networks (PTSN), one or more public land mobile networks (PLMN), one or more internet (TCP/IP) networks, or any other suitable networks. In this manner, the SMSC is capable of receiving and sending SMS messages from mobile devices, and then relaying the messages to other devices via the gateways. Furthermore, data can be received by the SMSC from the gateways, and then relayed to mobile devices as SMS messages. Gateways may be particularly useful when either or both the sender or recipient is not capable of the SMS protocol.

SMS refers to one or more related standards and protocols for sending and receiving messages (referred to as SMS messages). Although SMS originally refers to a particular messaging protocol defined under the Groupe Special Mobile (GSM) standard for mobile phones, as used herein the SMS protocol may also refer to various related and alternative standards, such as, but not limited to, services implemented using protocols and networks based on code division multiple access (CDMA), wideband-CDMA, CDMA-2000, frequency division multiple access (FDMA), time division multiple access (TDMA), advanced mobile phone system (AMPS), digital AMPS, general packet radio service (GPRS), enhanced GPRS (EGPRS or EDGE), universal mobile telecommunications system (UMTS), or any other suitable standards that are known in the art and are implemented on satellite, mobile, landline, and other networks.

An SMS message is originally defined as the message type defined under the GSM standard. However, as used herein, SMS message may also refer to other message types known in the art such as, without limitation, a long SMS message, a concatenated SMS message, an enhanced SMS message, a multimedia SMS message, and any other suitable SMS message type.

SMS messages can be structured to include a data component (e.g., 160 7-bit characters under the GSM standard) and additional routing information. The routing information can include instructions relating to the SIM (i.e. user identifier), the mobile handset, the SMSC, the air interface, and any other suitable information. SMS messages may further include information related to the message's validity, priority, time-stamp, and any other suitable information.

In some embodiments, an SMS message can include message formats that have been extended from the standard protocols, such as enhanced messaging system (EMS) and multimedia messaging system (MMS). In such extended SMS messages, the message may include any data type that can be suitably contained or encoded therein, or a pointer or link thereto. Examples of data types that may be used in extended SMS messages include, without limitation, text messages, video clips, audio clips, pictures, universal resource locators (URLs), ring tones, remote-executable commands, and any suitable combination thereof.

In the present invention, an SMS message received by a user equipment device may be displayed on the device. For example, in some embodiments in which the user equipment device is a user media equipment that includes a set-top box and display, the SMS message may be received by the set-top box and displayed on the display. The receipt and display of SMS messages on other exemplary devices can occur in an analogous manner.

As described hereinabove, a user equipment device of the present invention may include storage means, in which the user equipment device may be configured to store one or more SMS messages in the storage means.

For example, referring again to FIG. 3, illustrative user equipment device 300 may be configured to store SMS messages in storage 308. For example, SMS messages may be stored in storage 308 after the SMS messages are received by the user equipment device. In another example, SMS messages may be stored in the user equipment device before being sent from the user equipment device to a remote location or device. Stored SMS messages may include or be associated with control information, which may include information relating to the sender of the SMS message, the recipient of the message, the time and date when the message was sent, the time and date when the message was received, and other suitable information. Other suitable types of control information are discussed herein in further detail.

In some embodiments of the present invention, the user equipment device may receive a plurality of SMS messages. In certain embodiments, the plurality of SMS messages originated as a single SMS message, or are intended to be displayed on the recipient user equipment device as a single SMS message. In these examples, the plurality of received SMS messages are to be reconstituted, such as by concatenation, to create the desired single SMS message for display. In some embodiments, at least one of the plurality of SMS messages may include or may be associated with at least a portion of control information (described herein). The control information may include, without limitation, information and/or instructions regarding the reconstitution of the plurality of SMS messages.

Figure 5:
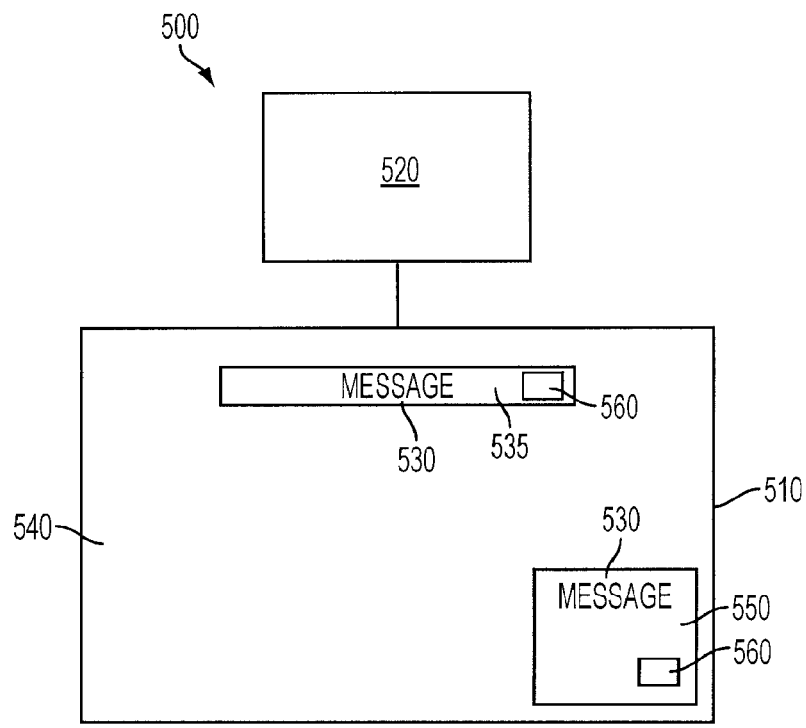
FIG. 5 is a diagram of an illustrative display screen of a user equipment device in accordance with one embodiment of the present invention.

SMS messages may be displayed on the recipient user equipment devices. For example, FIG. 5 shows an embodiment in which an illustrative SMS message is displayed on user equipment device 500. In certain embodiments, in which user equipment device 500 is a user media equipment, the device includes display 510 and set-top box 520. As described hereinbelow, set-top box 520 may be configured to receive the SMS message.

SMS message 530, when displayed on display 510, may be displayed in overlayer 535. Overlayer 535 may be displayed over displayed content 540. For example, content 540 may be media programming displayed on display 510. Thus, when SMS message 530 is displayed in overlay 535, the message appears over displayed content 540. In some embodiments, overlayer 535 may be suitably transparent or translucent, thereby allowing the underlying displayed content to be at least partially visible despite the displayed SMS message. In some embodiments, overlayer 535 may be suitably opaque or otherwise visibly contrasting with the underlying displayed content. In some embodiments, one or more SMS messages can displayed in a full screen.

In such embodiments, while the underlying content may be less visible, the visibility and/or readability of the displayed SMS message may be enhanced, and may also provide a visual notification of the displayed SMS message to a user.

In some embodiments, SMS message 530 may be displayed in pop-up window 550. Such pop-up windows may be configured to appear automatically when the message is displayed, thereby providing a visually-distinctive area in which to display the SMS message. The appearance of a pop-up windows may also advantageously provide a visual notification to a user that an SMS message is about to be displayed. As with overlayer 535, pop-up window 550 may be suitably transparent, translucent, opaque, or contrasting, for the advantages described above.

Overlayer 535 and pop-up window 550, when displayed, may also include icon or indicator 560. This icon or indicator may inform the user that additional portions of SMS message are available. In such embodiments, the user may be provided with the option to view additional portions of the message, or the complete message. If such an option is selected, the additional or complete message may be displayed in an overlayer or pop-up window, or it may be displayed in a new display configuration (e.g., full screen). If the SMS message is an extended SMS message, the user may be provided with an option to view the extended data types in the SMS message.

Although FIG. 5 apparently depicts both overlayer 535 and pop-up window 550 displayed in display 540 at the same time, in some embodiments either or both may be displayed in a given instance. In addition, multiple overlayers and/or pop-up windows may be displayed in certain embodiments. For example, multiple SMS messages may be displayed in multiple overlayers or pop-up windows, or any suitable combination thereof. One or more SMS messages 530 can also be displayed in a full screen display.

In some embodiments, the displaying of an SMS message may be accompanied by another indicator, such as an audible signal or a visible flash, either or both of which may be used to advantageously notify the user of the message.

In some embodiments of the present invention, an SMS message may be displayed on the user equipment device in conjunction with, or concurrent with, an interactive media guidance application that is also being displayed on the display. Interactive media guidance application applications are described hereinabove, examples of which are illustratively shown in FIGS. 1 and 2.

Referring again to FIG. 5, in some embodiments displayed content 540 may include a full-screen or partial-screen interactive media guidance application. Thus, as described above, SMS message 530 may displayed in overlay 535 or pop-up window 550 over the displayed interactive media guidance application.

Referring again to FIGS. 1 and 2, in embodiments in which an SMS message is displayed with an interactive media guidance application, the SMS message may be displayed in certain designated areas of display screens 100 or 200.

For example, the SMS message may be displayed in one or more cells and/or rows of grid 102. The SMS message may be displayed in the location of advertisement 124 or video region 122. In some embodiments, such as when the SMS message to be displayed includes additional extended data types as content, such as images, video, etc., such additional content may be displayed either with the SMS message, or separately; for example, in video window 122.

Option region 126 may also include on-screen options that allow the user to access features concerning the SMS message, such as displaying or dismissing the message, acknowledging the message, responding to the message, requesting additional portions of the message, and the like.

Referring again to FIG. 2, as with display screen 100 of FIG. 1, an SMS message may be displayed in any suitable location or region of display screen 200, such as listings 206, 208, 210, and/or 212.

Referring again to FIG. 4, SMS messages may be received by or sent to user equipment devices on any suitable communications means represented by communications network 414 and communication paths 408, 410, and 412, as described hereinabove.

For example, SMS messages by sent or received by user equipment devices 402, 404, and 406 via paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

In some embodiments, the system of the present invention may include one or more protocol gateways. For example, an SMSC of communications network 414 may include such gateways. Such gateways may be configured to convert SMS messages so that they can be communicated using other data communication protocols. For example, some embodiments include at least one SMS-to-email gateway and/or at least one email-to-SMS gateway, as are known in the art. With such gateways, an SMS message may be converted or encapsulated such that the SMS message can be transmitted and received such via the communication paths using email protocols. The reverse gateway allows emails to be transmitted and received as SMS messages.

The system may also include at least one gateway to de-convert or de-encapsulate the previously converted the message, thereby restoring and/or recovering the original message. Other suitable gateways allow conversion of SMS messages to and from instant messaging protocols, as are known in the art.

In some embodiments of the present invention, the user equipment device may be configured to receive a broadcast signal from a broadcast service, wherein the broadcast signal is received via said communication paths, as described in further detail hereinabove. In such embodiments, the user equipment device may receive an SMS message via the broadcast signal. Referring again to FIG. 4, the broadcast service may originate from, for example, media content source 416 or media guidance data source 418, as described in further detail herein. The broadcast signal from these broadcast services may be, for example, a digital satellite broadcast signal, a digital cable broadcast signal, a digital terrestrial broadcast signal, and other suitable signal.

The broadcast signal may include one or more signal components, in which data may be encoded. In this manner, data encoded and carried in such signal components are conveyed along with the broadcast signal. Thus, a user equipment device that receives a broadcast signal may also receive the data encoded within such signal components. Examples of signal components include a television channel sideband, a vertical blanking interval (VBI), an in-band digital signal, an out-of-band digital signal, or any other signal component suitable for transmitting encoded data with the broadcast signal. In some embodiments, the encoding of SMS messages in the broadcast signal can occur at an SMSC. The SMSC can also include a suitable SMS-to-broadcast gateway. In this manner, SMS messages received and stored by the SMSC, but that are destined for a user media equipment, can be encoded in the broadcast signal and relayed to the user media equipment via the gateway.

Figure 6:
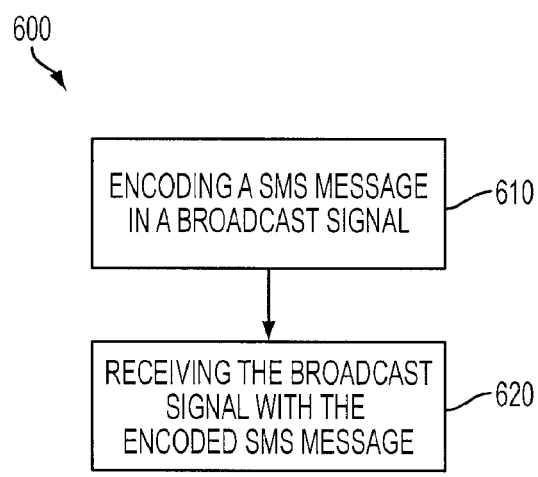
FIG. 6 shows an illustrative flow diagram for encoding and receiving an SMS message in accordance with an embodiment of the present invention.

FIG. 6 shows an illustrative process for a user equipment device, such as a set-top box of a user media equipment, to receive an SMS message encoded in a broadcast signal. In step 610, at least a portion of an SMS message is encoded in a signal component (such as a VBI) of a broadcast signal. In some embodiments, the SMS message may be apportioned between multiple signal components. In step 620, the broadcast signal, along with the encoded SMS message, may be received by the user equipment device. In some embodiments, the broadcast signal or the encoded SMS message may include information to allow the receiving equipment to decode the SMS message within the signal component. Such decoding information may also include, for example, information to allow the receiving equipment to concatenate or reconstitute the SMS message, as needed.

In some embodiments of the present invention, the SMS message may include or be associated with additional control information.

Control information can be included in the content of the SMS message itself, such as a data header. When included in this manner, the control information may include a data flag (or other suitable indicator) to indicate to the receiving device that the control information should not be displayed as part of the message. Control information can also be included as part of the routing information appended to the content of the SMS message, as described hereinabove. In this manner, the control information may be appended to the routing information, or it can use part of the data structure by replacing dispensable routing information. Also, control information may be appended to the SMS message data structure as metadata. In such embodiments, SMSCs and other mobile devices may be configured to recognize and handle such appended control information in a suitable manner.

In some embodiments, the SMS message may be received as a plurality of SMS messages, at least one of which may include or may be associated with a portion of the control information. In such embodiments, receipt of the plurality of SMS messages may result in association of the SMS message content with its control information.

In some embodiments of the present invention, an SMS message received by the user equipment device may be displayed on the device substantially upon its receipt by the user equipment device. In certain embodiments, the user may be presented with a notification of receipt of the SMS message. The user may then be provided with an option to display the message in response to the notification.

In some embodiments, the received SMS message may be displayed following the occurrence of a suitable triggering event. Thus, in such embodiments, the received SMS message may be stored on the user equipment device following its receipt by the device, awaiting occurrence of the triggering event. Upon detecting the occurrence of the triggering event, the SMS message may then be displayed on the device.

A suitable triggering event may include, without limitation, events that may be independent of the user's actions. For example, suitable triggering events may include, without limitation, a specified time of day, a specified date, the occurrence of a scheduled calendar event, a broadcast time of a specified program received by the user equipment device (e.g., a set-top box of a user media equipment), a display of a specified commercial on the user equipment device, a specified time interval prior to a broadcast time of a specified program received by the user equipment device, a display of a user-specified reminder on the user media equipment, a specified external event (e.g., news, weather, stock price, traffic, etc.) or any other suitable event that can be detectable upon its occurrence.

In some embodiments, the triggering event to display an SMS message may be a suitable action taken by the user. In particular, such user actions may be performed on the user equipment device. For example, when the user equipment device is a user media equipment, suitable actions may include, without limitation, actions taken on the device, on a component of the device (e.g., a display or a set-top box), on an application being executed and/or displayed on the device (e.g., an interactive media guidance application), or any other suitable and detectable user action.

For example, a suitable triggering event that is an action taken by the user may include, without limitation, tuning the user equipment device (e.g., a set-top box of a user media equipment) to a specified channel, selecting a specified program to be displayed on the user equipment device, setting a reminder, acknowledging a displayed notification message that is displayed on the user equipment device, starting the user equipment device, starting an application on the user equipment device, providing user-identifying information to the user equipment device or an application thereon, or any other suitable and detectable action by the user.

In some embodiments of the present invention, the occurrence of the triggering event, upon its detection, may result in displaying of its associated SMS message. Other suitable results may also result upon detection of the occurrence of the triggering event.

For example, a notification or alert may be displayed for the user that an SMS message has been received. The notification or alert may provide an option for the user to take an action regarding the SMS message, such as view, preview, delete, acknowledge, dismiss, postpone, or respond to the message, or any other suitable action.

As described hereinabove, an SMS message of the present invention may include or be associated with additional control information. Exemplary control information may include information that allows identification of a triggering event associated with the SMS message.

A user may be provided with an option to select an associated triggering event when composing and/or sending an SMS message. Any suitable manner for providing the user with such an option may be used.

For example, a user may send the SMS message to a "short code." A short code is an SMS address (usually numerical) that is interpreted by the SMSC for routing and delivery purposes. Thus, when the user sends an SMS message to a given short code, and the given short code corresponds to a triggering event, the SMS message can be associated with the triggering event, thereby identifying the event. Such association can include addition or inclusion of control information to the message, or routing the message to a suitable device, thereby also identifying the triggering event.

In some embodiments, the sender of an SMS message may be provided with an option to select one or more triggering events when composing and/or sending the message. Such an option may be presented as, for example, a menu interface, a command line, a selectable icon, or any suitable option. The user may also identify a triggering event by including a given command or code in the SMS message. In this manner, a suitably configured recipient device or SMSC can parse the command or code, and identify the associated triggering event. The foregoing option may result in the addition and/or inclusion of corresponding control information to the SMS message, in the manner described hereinabove.

The triggering event to display an SMS message can also be set at, or by, the receiving user media equipment. Triggering events that can be set at the receiving equipment can include any triggering event as described herein. For example, the receiving user media equipment can be configured such that the triggering event is the receipt of the SMS message, i.e., to display a received SMS message immediately following its receipt. In some embodiments, immediate display can be the default triggering event for the receiving equipment.

The triggering event can also be a given or user-selected event. For example, a suitable event may be the display of a commercial or promotion. In this example, displaying the SMS message during a commercial may be less distracting to the user, and more likely to elicit more of the user's attention. A triggering event can also be a suitable user-selected time. For example, user can select a time (e.g., at or just prior to the 11:00 PM news) at which the user knows he/she is going to be viewing a program, and thus any outstanding SMS messages can be displayed when the user is present and viewing the display.

Triggering events set at the receiving user media equipment can be set by a user. For example, a user at the receiving equipment, in a manner similar to that described above, may be provided with an option to select one or more triggering events that are to be identified for displaying a received SMS message. Such an option may be presented as, for example, a menu interface, a command line, a selectable icon, or any suitable option. The user-determined trigger events can form part of the user's profile.

When triggering events are set at or by the receiving user media equipment, the system can be further configured to determine its interplay with any triggering event that may be associated with a received SMS message. For example, in some configurations, triggering events set on the receiving equipment may be used only if the receiving SMS message is not associated with a triggering event. In such a configuration, if an SMS message is associated with a triggering event, then the triggering event on the receiving equipment may not be considered for the purpose of displaying the message. In some configurations, the reverse can be true, such that the triggering events set at the receiving equipment always controls or prevails over a triggering event associated with a received SMS message. In other configurations, the determination of which triggering event controls can be based on suitable criteria, such as the nature of the SMS message (e.g., priority, sender, content, etc.), the time of day, the current activity being displayed on the user media equipment, and the like. For example, the receiving media equipment may be set with a triggering event that postpones display of any SMS message until a later time, even if the SMS message is associated with its own triggering event. However, in some cases, the equipment may be further configured such that if the SMS message is high priority, or from a certain user, then the message is displayed immediately, or based on its associated triggering event, even if a different triggering event is set on the receiving equipment.

Figure 7:
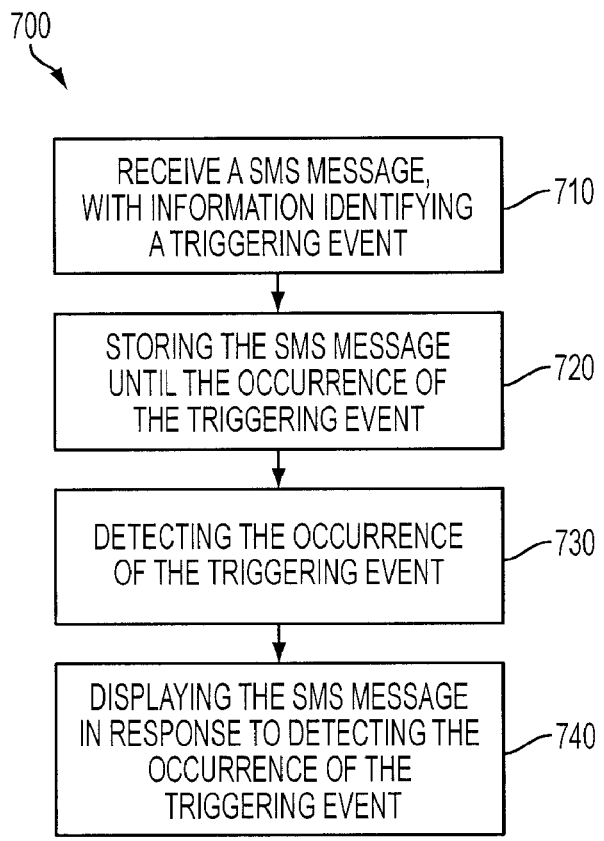
FIG. 7 shows an illustrative flow diagram for receiving and displaying an SMS message in accordance with an embodiment of the present invention.

FIG. 7 shows illustrative flow diagram 700 for displaying an SMS message in accordance with one embodiment of the present invention. This and other embodiments of the present invention may be implemented on a user equipment device, such as a user media equipment. The user media device may include a set-top box with storage, and a display. Where appropriate, this and other illustrative processes of the present invention may, for example, be implemented completely in the processing or control circuitry of a user equipment device (e.g., control circuitry 304 or processing circuitry 306), or may be implemented at least partially in a media guidance source or other equipment that are remote from the user media equipment.

In step 710, an SMS message is received by the user equipment device. The message may include or may be associated with control information, in which the control information may include information that identifies a triggering event. As discussed above, the identified triggering event may serve as a condition for an action to be taken with respect to the SMS message, such as displaying the SMS message or a notification thereof.

In step 720, the received SMS message may be stored on the user equipment device (e.g., in a storage component) until the occurrence of the identified triggering event. In some embodiments, the SMS message may be stored on a remote device, such as a remote server or other remote source. This remote storage may be after identifying the triggering event after receiving the SMS message, or pre-emptively (i.e., before receipt of the SMS message by the user equipment device). In such embodiments, upon detection of the occurrence of the triggering event (as described below), the remotely-stored SMS message may be sent to the user equipment device.

In step 730, the occurrence of the identified triggering event is detected. In some embodiments, this detection may result from a continuous or regular polling of the system to detect the triggering event. In other embodiments, occurrence of the triggering event itself may provide specific notification that the event has occurred.

In step 740, in response to the detection of the occurrence of the identified triggering event, the SMS message is displayed on the user equipment device.

In some embodiments of the present invention, the control information (as described herein) included in or associated with an SMS message may include information that identifies one or more intended recipients of the SMS message. This recipient information may include information that identifies the person(s) intended to receive the SMS message. This recipient information may include information that identifies the device intended to receive the SMS message.

In some embodiments, the foregoing control information that identifies the intended recipient(s) may be used to direct the transmission of the SMS message to those recipients. In some embodiments, as described below, such control information may be used in a different manner, in which the recipient may determine whether it is an intended recipient of the message.

Figure 8:
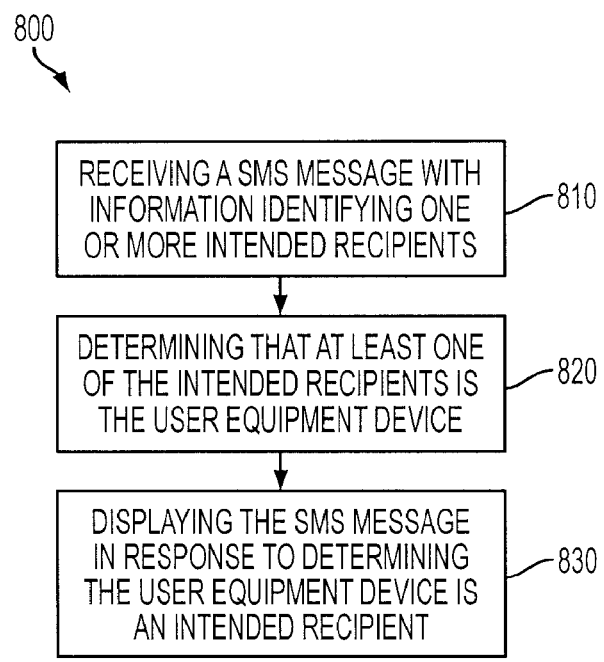
FIG. 8 shows an illustrative flow diagram for identifying recipients of the SMS message in accordance with an embodiment of the present invention.

FIG. 8 shows illustrative flow process 800 which may utilize such control information. In step 810, an SMS message is received, in which the SMS message may include or may be associated with control information that identifies one or more recipients of the message.

In step 820, the receiving user equipment device determines that at least one of the identified intended recipients is the receiving device, or a user thereof. In step 830, upon making such a determination, the received SMS message may be displayed on the receiving user equipment device in the manners described herein.

An advantage of the foregoing process may be, without limitation, allowing an SMS message with such control information to be broadly sent to a plurality of devices (or a plurality of users thereof), of which at least one is an intended recipient. In this manner, each receiving device may make the determination as to whether it is an intended recipient based on the associated control information, and, if such a determination is made, the intended recipients may then display the message.

In some embodiments of the present invention, upon displaying of an SMS message on a user equipment device, a user may be provided with the option to respond to the displayed SMS message. In some embodiments, the response may be sent to the sender (and/or other persons or devices) as an SMS message of one of the types described herein or otherwise known in the art. In some embodiments, the user may be provided with the option of responding via email, instant messaging protocol, voice mail, file transfer, or any other suitable communication or combination thereof.

However, the original SMS message sender may be using a user equipment device that may not be capable of receiving certain forms of responses. For example, although many mobile phones may be capable of sending or receiving SMS messages, not all may be capable of sending and/or receiving email messages.

Accordingly, in some embodiments, the user response may be sent via a gateway. For example, the user may respond to the displayed SMS message with an email. This email response may be sent via an email-to-SMS gateway, such that it is converted to, encapsulated in, or otherwise suitably converted so that it can be received as an SMS message. In certain embodiments, the system may be configured such that a gateway is used in both directions, such that an email-only user and an SMS-only user may communicate without substantial difficulty.

Figure 9:
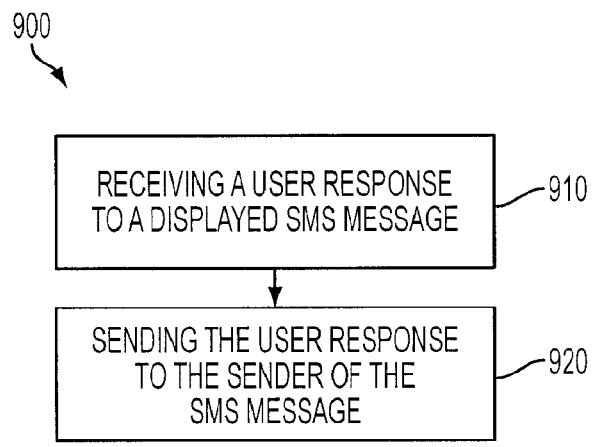
FIG. 9 shows an illustrative flow diagram for receiving and sending a user response to a displayed SMS message in accordance with an embodiment of the present invention.

For example, FIG. 9 shows illustrative process 900 for responding to a displayed SMS message. In step 910, a user response to a displayed SMS message may be received by the user equipment device. In step 920, the user response may be sent to the sender of the displayed SMS message. In some embodiments, the user response may be sent via an email-to-SMS gateway, or any other suitable gateway.

In some embodiments of the present invention, the system may include a plurality of user equipment devices (e.g., user media equipment with set-top boxes) that are in signal communication with each other. Further description of such device configurations are described hereinabove, and shown in FIG. 4.

In some embodiments having a plurality of suitable devices, at least one of the device may be configured to receive an SMS message. The SMS message may include control information (as described hereinabove) that identifies at least one of the other devices as an intended recipient of the SMS message. Accordingly, the receiving device may then determine the intended recipients of the SMS message, and forward the SMS messages to at least one of the intended recipients.

Figure 10:
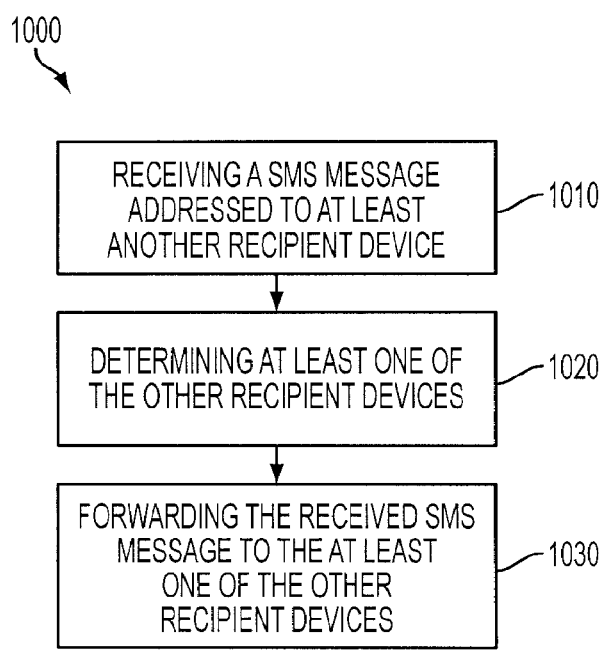
FIG. 10 shows an illustrative flow diagram for determining that a received SMS message is addressed to other recipient devices and forwarding the SMS message to said other recipient devices.

FIG. 10 show illustrative flow process 1000 in accordance with one such embodiment of the present invention. In step 1010, a user equipment device receives an SMS message, in which the SMS message may include or may be associated with control information. This control information may include the identities of at least one other intended recipient device. In step 1020, the user equipment device receiving the SMS message may determine at least one of the intended recipient devices based on the control information. In step 1030, the user equipment device receiving the SMS message may then forward the received SMS device to at least one of the intended recipient devices.

It will be appreciated that while the discussion of media content has focused on video content, the principles of media guidance can be applied to other types of media content, such as music, images, etc.

The foregoing describes systems and methods for displaying a short message service (SMS) message on user media equipment. Those skilled in the art will appreciate that the invention can be practiced by other than the described embodiments, which are presented for the purpose of illustration rather than of limitation.

What is claimed is:

1. A method for causing an electronic message, written by a user of a mobile device, to be displayed on a user equipment device, the method comprising:
   receiving, with the user equipment device, from a remote server at which the electronic message is stored, the electronic message written by the user of the mobile device, wherein the electronic message includes control information that identifies a triggering event associated with display of the electronic message, and wherein the identified triggering event is independent of user action and is associated with at least one of a user profile and specified content being displayed on the display;
   storing the received electronic message in a storage device at the user equipment device;
   retrieving an identifier of a video that is generated for display on a display of the user equipment device;
   comparing the retrieved identifier of the video to an identifier of the specified content associated with the triggering event;
   determining, based on the comparing, that the retrieved identifier of the video matches the identifier of the specified content; and
   in response to determining that the retrieved identifier matches the identifier of the specified content, causing at least a portion of the electronic message to be displayed on at least a portion of the display of the user equipment device.

2. The method of claim 1, wherein:
   the electronic message is a short message service (SMS) message,
   the at least a portion of the display comprises a pop-up window, and
   causing the received electronic message to be displayed comprises causing the electronic message to be displayed in the pop-up window.

3. The method of claim 1, wherein:
   the electronic message is a short message service (SMS) message,
   an interactive media guidance application is implemented on the user equipment device,
   the at least a portion of the display is at least a portion of an interactive media guidance application display, and
   causing the received electronic message to be displayed comprises causing the received electronic message to be displayed in the at least a portion of the interactive media guidance application display.

4. The method of claim 1, wherein:
   the electronic message is a short message service (SMS) message,
   the electronic message includes control information in any one of content of the electronic message, routing information of the electronic message, or metadata of the electronic message.

5. The method of claim 1, wherein:
   the electronic message is a short message service (SMS) message,
   the at least a portion of the display comprises an overlay window, and
   causing the received electronic message to be displayed comprises causing the received electronic message to be displayed in the overlay window.

6. The method of claim 1, wherein:
   the electronic message is an extended short message service (SMS) message, and
   the user equipment device is a set-top box.

7. The method of claim 1, wherein:
   the electronic message is a short message service (SMS) message,
   the electronic message comprises information identifying one or more intended recipients of the electronic message, and
   receiving the electronic message comprises determining that at least one of the intended recipients of the electronic message is the user equipment device.

8. The method of claim 1, wherein
   the electronic message is a short message service (SMS) message, and
   receiving the electronic message comprises:
     receiving a plurality of electronic messages; and
     concatenating the received plurality of electronic messages to create the electronic message.

9. The method of claim 1, wherein
   the electronic message is a short message service (SMS) message, and
   further comprising:
     receiving a user response to the displayed electronic message; and
     sending the user response from the user equipment device to a sender of the displayed electronic message.

10. The method of claim 1, wherein the user profile corresponds to the user of the mobile device or a user of the user equipment device.

11. A system for causing an electronic message, written by a user of a mobile device, to be displayed on a user equipment device, the system comprising:
    control circuitry configured to:
      receive the electronic message written by the user of the mobile device, wherein the electronic message includes control information that identifies a triggering event associated with display of the electronic message, and wherein the identified triggering event is independent of user action and is associated with at least one of a user profile and specified content being displayed on the display;
      store the received electronic message in a storage device at the user equipment device;
      retrieve an identifier of a video that is generated for display on a display of the user equipment device;
      compare the retrieved identifier of the video to an identifier of the specified content associated with the triggering event;
      determine, based on the comparing, that the retrieved identifier of the video matches the identifier of the specified content; and
      in response to determining that the retrieved identifier matches the identifier of the specified content, cause at least a portion of the electronic message to be displayed on at least a portion of the display of the user equipment device.

12. The system of claim 11, wherein:
    the electronic message is a short message service (SMS) message,
    the at least a portion of the display comprises a pop-up window, and
    the control circuitry is further configured to cause the electronic message to be displayed in the pop-up window.

13. The system of claim 11, wherein:
the electronic message is a short message service (SMS) message,
an interactive media guidance application is implemented on the user equipment device,
the at least a portion of the display is at least a portion of an interactive media guidance application display, and
the control circuitry is further configured to cause the received electronic message to be displayed in the at least a portion of the interactive media guidance application display.

14. The system of claim 11, wherein:
the electronic message is a short message service (SMS) message, and
the electronic message includes control information in any one of content of the electronic message, routing information of the electronic message, or metadata of the electronic message.

15. The system of claim 11, wherein:
the electronic message is a short message service (SMS) message,
the at least a portion of the display comprises an overlay window, and
the control circuitry is further configured to cause the received electronic message to be displayed in the overlay window.

16. The system of claim 11, wherein:
the electronic message is an extended short message service (SMS) message, and
the user equipment device is a set-top box.

17. The system of claim 11, wherein:
the electronic message is a short message service (SMS) message,
the electronic message comprises information identifying one or more intended recipients of the electronic message, and
the control circuitry is further configured to determine that at least one of the intended recipients of the electronic message is the user equipment device.

18. The system of claim 11, wherein
the electronic message is a short message service (SMS) message, and
the control circuitry is further configured to:
receive a plurality of electronic messages; and
concatenate the received plurality of electronic messages to create the electronic message.

19. The system of claim 11, wherein
the electronic message is a short message service (SMS) message, and
the control circuitry is further configured to:
receive a user response to the displayed electronic message; and
send the user response from the user equipment device to a sender of the displayed electronic message.

20. The system of claim 11, wherein the user profile corresponds to the user of the mobile device or a user of the user equipment device.

* * * * *